May 29, 1951     A. SAUNDERS     2,554,640
ROLLER BOX TOOL FOR TURRET LATHES
Filed Nov. 30, 1948
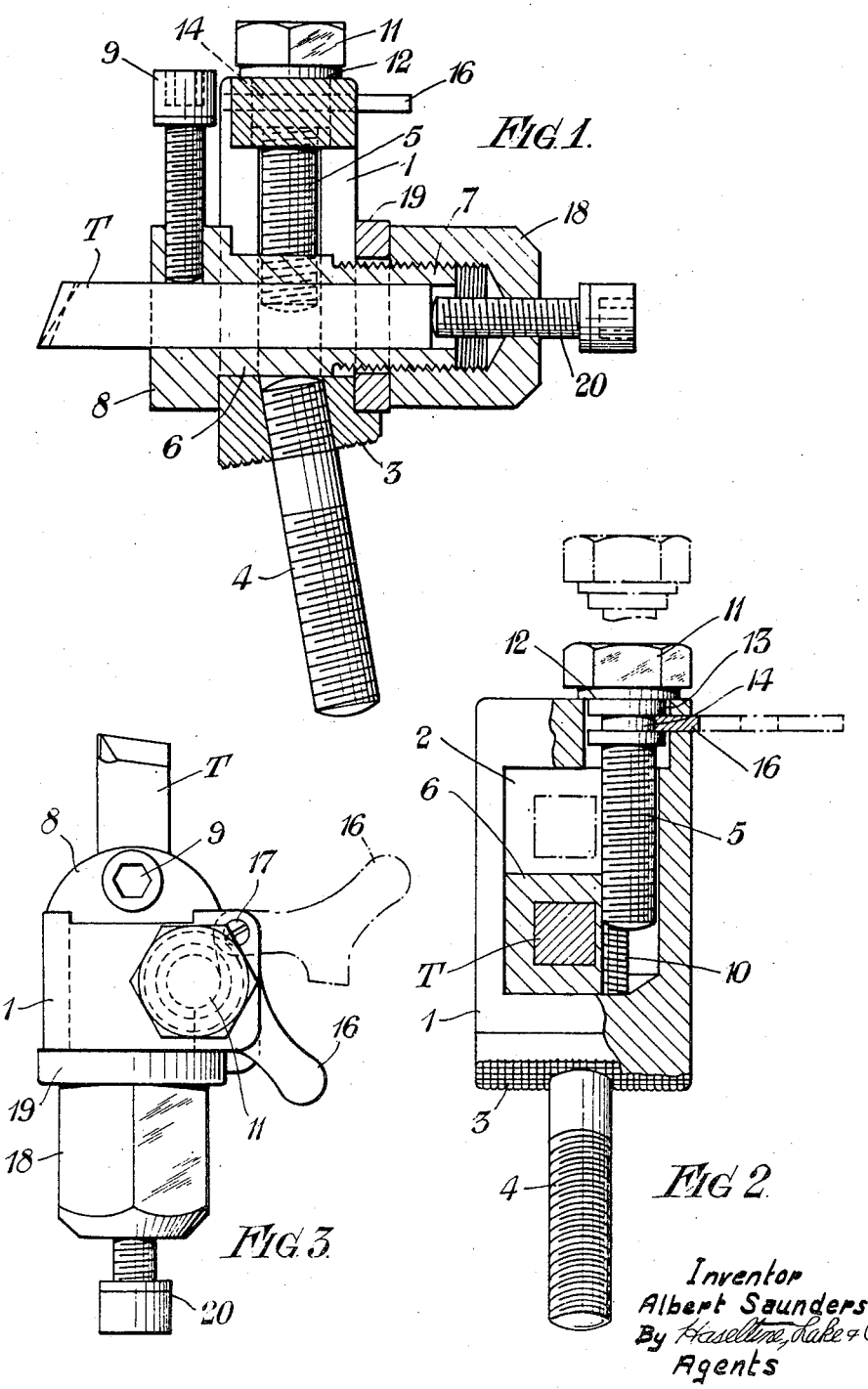
Inventor
Albert Saunders
By Haseltine, Lake & Co.
Agents Patented May 29, 1951

2,554,640

UNITED STATES PATENT OFFICE 2,554,640

ROLLER BOX TOOL FOR TURRET LATHES

Albert Saunders, Denham, England

Application November 30, 1948, Serial No. 62,675
In Great Britain November 20, 1947

3 Claims. (Cl. 82—36)

This invention relates to tool post assemblies and is more particularly concerned with the provision of a tool post which will permit rapid adjustment of the tool to a desired location. The tool post assembly of the invention can be employed in lathes and like machine tools.

An object of the invention is to provide a tool post assembly comprising a tool post body having an aperture therein, a tool holder adapted to fit in the aperture of said tool post and to slide in the direction transverse to the longitudinal axis of the tool, a bore in the tool post body, such bore opening into the aperture in said body, a screw entered in said bore, a recess in the tool holder, screw threading upon said recess for co-operation with screw-threading upon said screw and means for holding said screw at will in a position where it is held against axial movement.

For a better understanding of the nature of the invention and to show how the same may be carried into effect, reference will now be made to the accompanying drawings in which:

Figure 1 is a side sectional view of a complete tool post made in accordance with the invention, Figure 2 is an end view partially in section of the tool post shown in Figure 1, and Figure 3 is a plan view corresponding to Figure 1.

In the drawings, the tool post body is shown as comprising a heavy rectangular plate 1 having an oblong aperture 2 therein. The base of the plate 1 is formed with serrations 3 for ensuring a satisfactory seating of the tool post upon a surface to which it is to be fixed. A stud 4 has one threaded end entered into a suitably internally threaded aperture formed in the base of the plate 1, the other external screw-threaded portion of the stud being intended for the clamping of the tool post in a working position.

The tool post body has a vertical drilling in which the screw-threaded shank 5 of a bolt, is entered. The shank 5 of the bolt is a loose fit in the drilling, and it will be observed from the partial section in Figure 2 that where the drilling enters the rectangular aperture 2, the bore is open in such aperture. The aperture 2 accommodates the tool holder which is formed with a square section body portion 6 which is adapted to fit within the oblong aperture 2. Integral with the square section portion 6 and extending rearwardly thereof, there is a sleeve-like portion 7 which is externally screw-threaded. The forward end of the tool holder has a head 8 which fits closely against the adjacent face of the tool post body member 1, as seen in Figure 1. The tool holder has an aperture formed therein which extends completely through the holder for the reception of a tool T. To locate the tool in the tool holder, a screw 9 is provided in the head portion 8.

As appears best from Figure 2, one side of the square section portion 6 of the tool holder body has a recess which is approximately semi-cylindrical. The semi-cylindrical recess has screw-threading 10 which is intended for engagement with the external screw-threading of the shank 5 of the bolt entered in the tool post body. The bolt 5 has a head 11 for engagement by a spanner, and immediately beneath the head 11 there is a flange 12 which is seated upon the outer surface of the tool post body. Below the flange 12 there is an annular portion 13 having a peripheral groove 14. As appears from Figure 2, the bore in the tool post body for the reception of the bolt having the shank 5, has an enlarged mouth into which the annular portion 13 fits.

Laterally of the bore in the tool post body there is formed a recess which extends across the tool post body member 1 and which serves to accommodate a latch 16. One end of the latch is pivotally secured as at 17 in a recess, whilst the other end of the latch is extended to form a finger piece. The shape of the latch is best seen in chain-dotted lines in Figure 3. From Figure 2 it will be observed that the recess accommodating the latch 16, opens into the bore formed in the tool post body member so that a portion of the latch 16 can be thrust into the peripheral groove 14 in the annular portion 13 of the bolt. It will be clear that by manipulation of the fingerpiece 16 the latch can be withdrawn from the annular groove.

The tool post is completed by a cap nut 18 which is internally screw-threaded to engage the external screw-threading upon the annular portion 7 of the tool holder. As appears from Figure 1, when the cap-nut 18 is tightened upon the tool holder a washer 19 is compressed as between the cap-nut and one face of the tool post body. The cap-nut has an internally screw-threaded aperture for reception of a bolt 20 the inner end of which contacts the tool T.

In the use of the tool post described above, the tool T is first entered in the tool holder and the tool holder is then placed in position in the tool post as shown in Figure 1, if the tool holder has for some reason been removed from the tool post. The tool holder may be lightly held in position in the tool post by tightening the cap-nut 18 by hand. The latch 16 is brought to the position indicated in chain-dotted line in Figure 3, which frees the latch from engagement with the annular groove 14. It is now possible to raise the tool holder to some position within the tool post, without the necessity of turning the head 11 of the screw having the shank 5. A final accurate setting of the tool holder can be made by turning the head 11 until the latch 16 can be swung into position where it engages the peripheral groove 14. With the latch engaged, the motion of the head 11 in either direction will produce fine adjustment of the tool setting in either direction transverse to the longitudinal axis of the tool. Once the correct setting for the tool holder has been obtained, the cap-nut 18 is tightened in order to retain this setting.

The tool T can be adjusted within the tool holder by slacking the set screw 9 and adjusting the screw 20. When the desired adjustment is achieved with screw 20 the set screw 9 will again be tightened.

In Figure 2 in order to indicate the range of quick adjustment that can be obtained for the tool holder, the tool holder is indicated in full lines at its lowest position and in chain dotted lines at its highest position. Similarly the lowest position of the head 11 is seen in full lines and its highest position in chain dotted lines.

The tool post is of particular value when employed in conjunction with the roller box steadies described in my co-pending U. S. patent applications Nos. 606,795, 607,339, now Patent No. 2,513,819, granted July 4, 1950, and 607,338, now abandoned.

I claim:

1. A tool post assembly comprising a tool post body having an aperture therein, a tool holder adapted to fit in the aperture of said tool post and to slide in the direction transverse to the longitudinal axis of the tool, a bore in the tool post body, such bore opening into the aperture in said body, a screw entered in said bore, said screw being a free sliding fit in said bore, a recess in the tool holder, screw threading upon the recess of the tool holder for co-operation with screw-threading upon said screw, a latch provided upon the tool post body, and a peripheral groove formed upon the screw, said groove being engageable by the latch so that the screw may be maintained at will at a position where it is held against axial movement.

2. A tool post assembly comprising a tool post body having an aperture therein, a tool holder adapted to fit in the aperture of said tool post and to slide in the direction transverse to the longitudinal axis of the tool, a bore in the tool post body, such bore opening into the aperture in said body, a screw entered in said bore, said screw being a free sliding fit in said bore, a recess in the tool holder, screw threading upon the recess of the tool holder for co-operation with screw-threading upon said screw, means for holding said screw at will in a position where it is held against axial movement, and a cap nut threadedly engaging said tool holder and pressing against the tool post, whereby the tool holder may be arranged for clamping in an adjusted position in the tool post.

3. A tool post assembly comprising a tool post body having an aperture therein, a tool holder adapted to fit in the aperture of said tool post and to slide in the direction transverse to the longitudinal axis of the tool, a bore in the tool post body, such bore opening into the aperture in said body, a screw entered in said bore, said screw being a free sliding fit in said bore, a recess in the tool holder, screw threading upon the recess of the tool holder for co-operation with screw-threading upon said screw, a latch provided upon the tool post body, a peripheral groove formed upon the screw, said groove being engageable by the latch so that the screw may be maintained at will at a position where it is held against axial movement, and a cap nut threadedly engaging said tool holder and pressing against the tool post, whereby the tool holder may be arranged for clamping in an adjusted position in the tool post.

ALBERT SAUNDERS.

REFERENCES CITED

The following references are of record in the file of this patent:

UNITED STATES PATENTS

| Number | Name | Date |
| --- | --- | --- |
| 495,576 | Barraclough | Apr. 18, 1893 |
| 690,763 | Parker | Jan. 7, 1902 |
| 2,390,148 | Hijmans | Dec. 4, 1945 |

FOREIGN PATENTS

| Number | Country | Date |
| --- | --- | --- |
| 545,568 | Great Britain | June 2, 1942 |